Jan. 9, 1934.      C. R. HUBBARD ET AL      1,942,704
GASKET
Filed Jan. 6, 1932

Inventors:
Cecil R. Hubbard and
Francis W. Armstrong,
By their Attorneys,
Fraser, Myers & Manley.

Patented Jan. 9, 1934

1,942,704

UNITED STATES PATENT OFFICE 1,942,704

GASKET

Cecil R. Hubbard and Francis William Armstrong, Palmyra, N. Y., assignors to The Garlock Packing Company, Palmyra, N. Y., a corporation of New York Application January 6, 1932. Serial No. 584,913

5 Claims. (Cl. 288—1)

The invention is directed to a composite gasket comprising packing material and a relatively inexpensive readily attachable and detachable centering element, the packing material being localized to so much of the gasket as is relied upon to adapt it for use as a joint sealing device, the centering element comprising an added marginal extension of such size and form as to be adapted to make aligning contact with the fastening elements or other opposing position-determining surface portions of the structure to be sealed by the gasket and serve as a templet to properly position the packing material.

The centering element of the packing may comprise relatively cheap material such as pasteboard, papier-mâché or soft wire which has been referred to in the claims as "tractable" material to indicate its yielding properties as a result of which complemental portions of the packing and centering elements may be readily pressed into and out of mutual engagement. It may be applied to either the inner or the outer margin of the packing element of the gasket, which may be slightly hollowed or grooved and of a relative form such that one may be snapped into engaging relation with the other and readily separated therefrom if desired even though the engagement be in the nature of a mere frictional engagement adapted to yield on application of pressure.

If the structure to be packed by the gasket has a plurality of spaced openings the joints about which are to be sealed, a number of packing elements of a size and form such as to localize the packing material about the openings may be mounted in a single centering element of relatively inexpensive material as compared with the present practice of using an extension of the more expensive packing material to serve as a centering means.

In the accompanying drawing illustrating various preferred forms of the invention:—

Figures 8, 9:
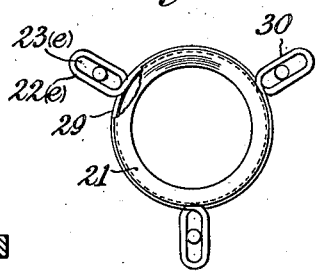
Fig. 8 is a face view of a modified form of gasket having a wire structure instead of a structure of cardboard or analogous material as its centering element.
Fig. 9 is a cross-sectional view of a flanged pipe end and a modified form of gasket having the centering element applied internally instead of externally.
Figure 10:
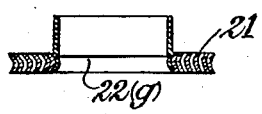

Fig. 10 is a cross-sectional view through a gasket somewhat similar to the one disclosed in Fig. 9, but having a concave surface in the attaching portion of the centering element to cooperate with a convex marginal portion of the packing element, as distinguished from the form illustrated in Fig. 9 in which the centering element has a convex attaching portion to be snapped into a groove in the packing element.

Figure 1:
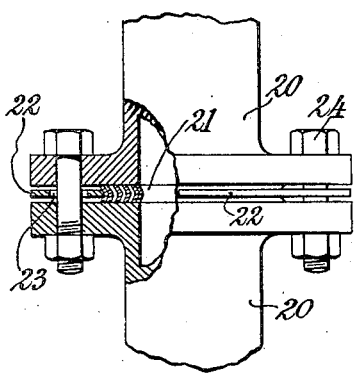
Figure 1 is a side view of a pair of pipe ends the joint between which is indicated as being packed by a gasket embodying the above-described invention, parts of the structure being illustrated in cross-section.
Figure 2:
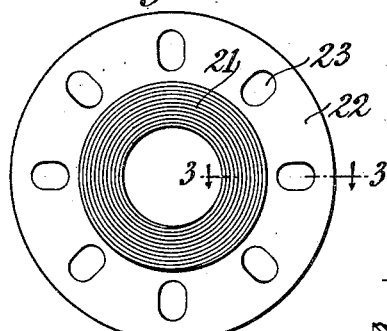
Fig. 2 is a face view of the gasket used in sealing the joint between the pipe ends illustrated in Fig. 1.

In Figs. 1 and 2 the invention is illustrated as applied to a gasket for a pair of flanged pipe ends 20. It comprises an annular sealing element 21 of packing material and a surrounding centering element 22 having openings 23 therein through which pass the bolts or other fastening elements 24 by which the pipe ends are secured together. If desired, the openings 23 may be elongated and have their longer axes disposed radially as shown, so as to accommodate various pipe ends the fastening elements of which may be spaced at different distances from the longitudinal axis of the pipe. If the widths of these openings are such as to provide only a working clearance between the surrounding metal and the fastening elements, any such construction having three or more fastening elements will cause the sealing element 21 to be centered with the openings in the pipe ends when the parts are connected.

Figure 3:
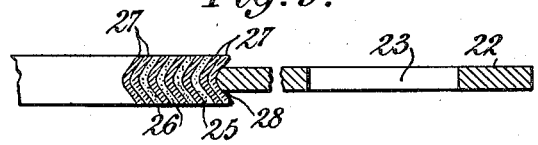
Fig. 3 is a cross-section through a portion of the gasket illustrated in Fig. 2, the section being taken along the line 3—3.

The sealing element 21, more clearly illustrated in the cross-sectional view, Fig. 3, preferably comprises a composite structure of metal and fibrous or other relatively soft packing material, and may be built up of a plurality of ring-like elements, with the parts of metal and soft packing material arranged in alternation. This may best be accomplished by constructing the sealing element of a narrow metal ribbon 25 and a narrow ribbon of fibrous material 26 placed side by side and wound into a spiral, as indicated in Fig. 2. The ribbon of fibrous material may be relatively shorter than the metal ribbon in order that two or more coils 27 of the metal spiral may be brought into mutual contact at the inner and outer margins of the ring and secured together in any appropriate manner, as by soldering or welding.

In order that the ring may be sufficiently elastic to compensate for variations of pressure due to temperature changes and other disturbances to which the packing may be subjected when in use, the cross-sectional form of the ribbon may be concavo-convex as indicated, and should be of a thickness and resilience such that it may bend or yield slightly when subjected to pressure between the surfaces of the structure to be sealed without being strained beyond its elastic limit, thus enabling it to resume its normal thickness when released.

A packing embodying the invention in the form herein illustrated and described may be relatively thin, yet capable of satisfactorily conforming with slight irregularities of the surfaces of the parts of the structure between which it is used and effect a highly efficient seal. In the accompanying drawing illustrating the invention the thickness of the packing has been exaggerated in order to more clearly disclose details of structure.

As best indicated in Fig. 3, the use of the concavo-convex ribbon in constructing the packing provides a groove 28 in its periphery which affords a very satisfactory means of connecting the centering element to the sealing element. By making the opening in the centering element of an appropriate diameter the centering element may be readily sprung into place in the peripheral groove in the sealing element and as readily detached therefrom, the depth of the groove being such that the engagement may be properly defined as a frictional engagement adapted to yield on application of pressure.

Figure 4:
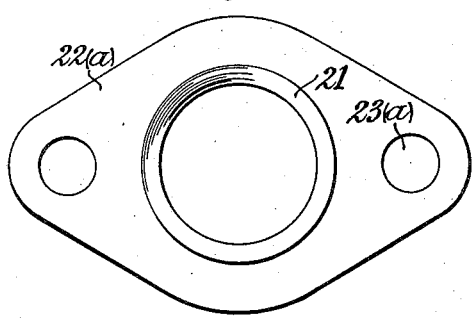
Fig. 4 is a face view of a modified form of gasket.

In Fig. 4 is illustrated a modified form of the invention in which the sealing element 21 is mounted in a centering element 22(a) having but one pair of circular openings 23(a) for fastening elements.

Figure 5:
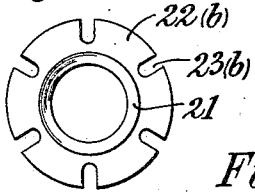
Fig. 5 is a face view of another modified form of gasket having slots instead of holes in the centering element to cooperate with the fastening elements of the structure to be sealed by the gasket in centering the packing element.

In Fig. 5 is disclosed a modified form of the invention in which the sealing element 21 is mounted in a centering element 22(b) having radial slots 23(b) extending inwardly from the periphery instead of openings with closed walls to receive the fastening elements.

Figure 6:
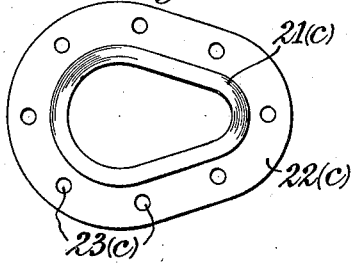
Fig. 6 is a face view of another modified form of gasket adapted to pack a joint about a noncircular opening.

Fig. 6 illustrates a modified form of the invention comprising a sealing element 21(c) adapted to seal a joint of non-circular form, the sealing element being mounted in a centering element 22(c) of similar non-circular form having openings 23(c) therein to receive the fastening elements.

Figure 7:
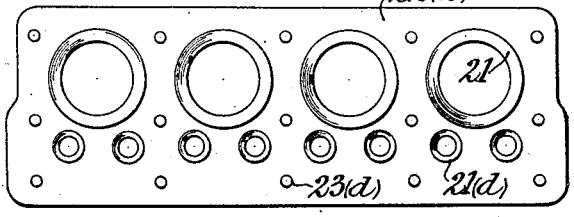
Fig. 7 is a face view of a modified form of gasket adapted to pack the joint between a cylinder block for a multi-cylinder engine and a cylinder head for said block.

Fig. 7 illustrates a gasket comprising a single centering element 22(d) having openings 23(d) therein for the fastening elements and having mounted therein a plurality of sealing elements 21 and a number of sealing elements 21(d) of smaller size. A gasket of this character is adapted for use in sealing joints of various sizes and arrangement in the cylinder block of a multi-cylinder engine.

In Fig. 8 is disclosed a modified form of the invention comprising a sealing element 21 and a centering element 22(e). This centering element comprises a piece of wire having portions 29 to be sprung into the groove in the periphery of the sealing element and looped portions 30 providing openings 23(e) to receive fastening elements.

Fig. 9 is a longitudinal cross-sectional view of a pipe end 20 and a gasket comprising a sealing element 21(f) having a centering element 22(f) extending from its inner margin. The sealing element of this gasket differs from the one illustrated in Fig. 3 in that the metal ribbon is so spiralled as to cause the groove to be disposed at the inner margin, and the centering element is provided with a marginal bead adapted to be snapped into engaging relation with the groove. The centering element has an axially-disposed cylindrical portion 23(f) adapted to be slipped into the end of the pipe and thus center the sealing element.

In Fig. 10 is disclosed a gasket somewhat similar to the one illustrated in Fig. 9, the only difference being that the sealing element 21 is like the one disclosed in Fig. 3, having its groove at the outer margin. The centering element 22(g) is grooved at one margin to receive the convex inner marginal portion of the sealing element.

It will be apparent that gaskets constructed in accordance with this invention will result in a relatively large saving in material, workmanship, and amount of invested capital. The sealing elements may be made up in the requisite number of standard sizes conforming with the sizes of the openings in the parts to be packed, irrespective of the relative arrangement of fastening elements. The centering devices may likewise be prepared to suit the various types of connection with which they must cooperate in order to align the sealing devices. The sealing devices and centering devices may, if desired, be kept in stock separately and quickly assembled either when sold or delivered or when needed for use. Whenever a stock size of sealing element is to be applied to apparatus having some special form or arrangement of fastening elements, an appropriate centering element may be readily constructed in view of the character of the material of which they are made.

One of the largest economies resulting from the use of gaskets embodying the invention is due to the localizing of the relatively expensive packing material to the zone immediately where it is needed to seal a joint and the addition of an element of relatively inexpensive material to serve as a templet or centering device adapted to properly position the packing material.

The invention is not intended to be limited to the forms herein disclosed for purposes of illustration, but should be regarded as comprising other modifications and variations within the scope of the appended claims.

What is claimed is:

1. A gasket comprising packing material and a relatively inexpensive, readily attachable and detachable centering element adapted to frictionally engage the packing material, said packing material being localized throughout so much of the gasket as is relied upon to adapt it for use as a joint sealing device and the centering element comprising an added, continuous, marginal extension of tractable material of such size and form as to be adapted to make aligning contact with opposing position-determining surface portions of the structure to be sealed by the gasket and serve as a templet to properly position the packing material, the packing material and centering element being so constructed and arranged as to be capable of being quickly assembled and disassembled as completed units by merely pressing contiguous complemental marginal portions of the packing material and of the centering element into and out of engagement with each other.

2. A gasket, as defined by claim 1, comprising a packing element having a shallow marginal groove, and of which the centering element has an attaching portion of a size and shape adapting it to be sprung into said groove.

3. A gasket, as defined by claim 1, of which the centering element surrounds and extends beyond the packing material and has spaced surface portions so positioned as to be clear of a plurality of position-determining surfaces of the fastening elements of the structure having the joint to be sealed only when the packing material is in its joint sealing position.

4. A gasket, as defined by claim 1, comprising a packing element having a marginal groove and of which the centering element comprises a wire structure having portions adapted to be snapped into an engaging relation with the grooved portion of the packing element and portions bent to appropriate form to make contact with the position-determining surface portions of the structure adjacent the joint to be packed.

5. A gasket, as defined by claim 1, of which the packing material is so disposed as to be adapted to seal the joints about a plurality of spaced openings, the packing elements for the respective openings being mounted in their proper spaced relation in the centering element.

CECIL R. HUBBARD.
FRANCIS WILLIAM ARMSTRONG.